UNITED STATES PATENT OFFICE.

EUGENE T. BURNETTE, OF HAYWARDS, CALIFORNIA.

METHOD OF PRESERVING EGGS.

SPECIFICATION forming part of Letters Patent No. 479,970, dated August 2, 1892.

Application filed June 9, 1892. Serial No. 436,147. (No specimens.)

*To all whom it may concern:*

Be it known that I, EUGENE T. BURNETTE, a citizen of the United States, residing at Haywards, Alameda county, State of California, have invented an Improvement in Preserving Eggs; and I hereby declare the following to be a full, clear, and exact description of the same.

My invention relates to the art of preserving eggs.

It consists in subjecting the eggs contained in a confined compartment to the action of the fumes or vapors arising from the combustion of a composition of matter consisting of chlorate of potash, sugar, and salicylic acid.

In carrying out my invention I place the eggs in a confined apartment and dispose them in any suitable manner, so that they shall be equally and perfectly subjected to the action of the fumes or vapor. I then take chlorate of potash, sugar, and salicylic acid, and after mixing them place them in the bottom of the apartment. In practice I prefer to use these ingredients in equal parts, though these proportions may be varied. Then by suitable means, as by a fuse or by electricity, I ignite this compound and the fumes or vapors arising therefrom envelop the eggs, which are thus fully subjected to their action. The eggs are thus treated for about an hour, at the end of which time the action is complete and the eggs will remain fresh and wholesome a long time.

Having thus described my invention, what I claim as new, and desire to secure by Letters Patent, is—

The method of preserving eggs, which consists in subjecting them to the action of the fumes or vapors arising from the combustion of a composition of matter consisting of chlorate of potash, sugar, and salicylic acid, substantially as herein described.

In witness whereof I have hereunto set my hand.

EUGENE T. BURNETTE.

Witnesses:
 S. H. NOURSE,
 J. A. BAYLESS.